(12) United States Patent
Koyatsu et al.

(10) Patent No.: US 8,830,526 B2
(45) Date of Patent: Sep. 9, 2014

(54) IMAGE PROCESSING APPARATUS, IMAGE PROCESSING METHOD, AND NON-TRANSITORY COMPUTER READABLE MEDIUM

(71) Applicant: Fuji Xerox Co., Ltd., Tokyo (JP)

(72) Inventors: Jun Koyatsu, Kanagawa (JP); Masahiko Kubo, Kanagawa (JP); Hideki Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/804,225

(22) Filed: Mar. 14, 2013

(65) Prior Publication Data

US 2014/0043625 A1 Feb. 13, 2014

(30) Foreign Application Priority Data

Aug. 8, 2012 (JP) ................................. 2012-176060

(51) Int. Cl.
*H04N 1/60* (2006.01)
*G06F 3/12* (2006.01)
*G06K 15/02* (2006.01)

(52) U.S. Cl.
CPC ................ *G06K 15/18* (2013.01); *G06K 15/02* (2013.01)
USPC ........................................... 358/1.9; 358/1.1

(58) Field of Classification Search
USPC ......... 358/1.9, 1.1; 347/100, 101, 15, 41, 443
See application file for complete search history.

(56) References Cited

U.S. PATENT DOCUMENTS

| 5,232,814 A * | 8/1993 | Graves et al. ................. 430/158 |
| 5,763,064 A * | 6/1998 | Suzuki et al. ................. 428/216 |
| 8,529,043 B2 * | 9/2013 | Kakutani ....................... 347/100 |
| 2014/0043623 A1 * | 2/2014 | Koyatsu et al. ................ 358/1.1 |

FOREIGN PATENT DOCUMENTS

| JP | 62-67558 A | 3/1987 |
| JP | 2006-50347 A | 2/2006 |
| JP | 2006-317633 A | 11/2006 |

* cited by examiner

*Primary Examiner* — Charlotte M Baker
(74) *Attorney, Agent, or Firm* — Sughrue Mion, PLLC

(57) ABSTRACT

An image processing apparatus includes a color material layer forming unit and a proportion controller. The color material layer forming unit forms on a printing medium a first metallic color material layer including a color material having metallic particles, one or more process color material layers including color materials of one or more process colors, and a second metallic color material layer including a color material having metallic particles so that the first metallic color material layer, the one or more process color material layers, and the second metallic color material layer are stacked on the printing medium in this order. The proportion controller executes first control to increase a proportion of the second metallic color material layer with respect to the first metallic color material layer when a total amount of the color materials of the one or more process colors exceeds a predetermined value.

14 Claims, 5 Drawing Sheets

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-176060 filed Aug. 8, 2012.

BACKGROUND

Technical Field

The present invention relates to an image processing apparatus, an image processing method, and a non-transitory computer readable medium.

SUMMARY

According to an aspect of the invention, there is provided an image processing apparatus including a color material layer forming unit and a proportion controller. The color material layer forming unit forms on a surface of a printing medium a first metallic color material layer including a first color material having metallic particles, one or more process color material layers including color materials of one or more process colors, and a second metallic color material layer including a second color material having metallic particles so that the first metallic color material layer, the one or more process color material layers, and the second metallic color material layer are stacked on top of one another on the surface of the printing medium in order of the first metallic color material layer, the one or more process color material layers, and the second metallic color material layer. The proportion controller has a function for executing first control to increase a proportion of the second metallic color material layer with respect to the first metallic color material layer when a total amount of the color materials of the one or more process colors exceeds a predetermined value.

BRIEF DESCRIPTION OF THE DRAWINGS

An exemplary embodiment of the present invention will be described in detail based on the following figures, wherein.

DETAILED DESCRIPTION

An image processing apparatus according to an exemplary embodiment of the invention will be described with reference to the drawings.

Figure 1:
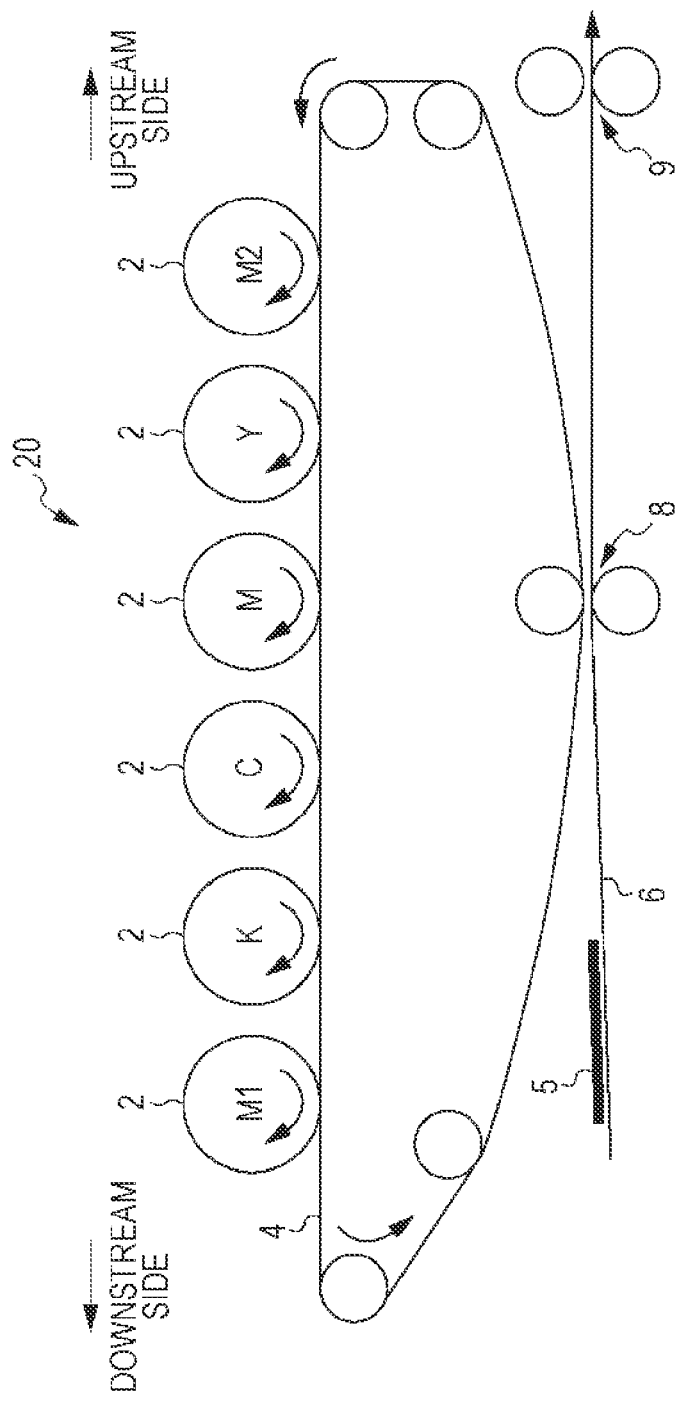
FIG. 1 schematically illustrates an example configuration of a print engine provided in an image processing apparatus according to an exemplary embodiment.

FIG. 1 schematically illustrates an example configuration of a print engine 20 (see FIG. 2) provided in the image processing apparatus according to the exemplary embodiment. In the illustrated example, the print engine 20 may be an intermediate transfer electrophotographic full-color print engine, and uses some toners of different colors as color materials. Further, the print engine 20 has a tandem photosensitive arrangement. The photosensitive arrangement includes photoconductors 2 for toners of process colors (hereinafter referred to as "process-color toners") such as yellow (Y), magenta (M), cyan (C), and black (K) and photoconductors 2 (M1 and M2) for toners including metallic particles (hereinafter referred to as "metallic toners") to enhance the metallic appearance of the printed piece. The photoconductors 2 (M1 and M2) for the metallic toners are disposed upstream and downstream of the photoconductors 2 for the process-color toners. The term "metallic appearance", as used herein, refers to a metallic shiny appearance, and is a general term used to describe a metallic luster (or lustrous appearance) and a sparkly appearance. The metallic luster (or lustrous appearance) is a luster (or lustrous appearance) caused by the specular reflection of light from a smooth metallic surface, and the sparkly appearance is the appearance of a sparkly shiny color produced in accordance with changes in the orientation of incident light by a metallic or similar fine cut glass oriented in various directions or an aggregation of metal fragments.

In the example illustrated in FIG. 1, toner images formed on the photoconductors 2 are transferred ("first transfer") onto an intermediate transfer belt 4 from the upstream side to the downstream side in a direction in which the intermediate transfer belt 4 travels, in the order of M2, Y, M, C, K, and M1, in such a manner that the toner images are registered with one another on the intermediate transfer belt 4. Thus, a full-color toner image having the layer of the metallic toner M1 as the uppermost layer and the layer of the metallic toner M2 as the lowermost layer is formed on the intermediate transfer belt 4. The full-color toner image is transferred ("second transfer") at a second transfer unit 8 onto a printing medium 5 (for example, sheet-shaped paper) transported by a medium transportation system 6. Thus, the full-color toner image whose lowermost layer is formed of the metallic toner M1 and uppermost layer is formed of the metallic toner M2 is formed on a surface of the printing medium 5. The full-color toner image is fixed onto the printing medium 5 by a fixing unit 9.

While the layer of the metallic toner M1 as the lowermost layer of the toners, which comes into contact with the printing medium 5, makes a relatively large contribution to the metallic luster (or lustrous appearance) (compared to the contribution to the sparkly appearance), the layer of the metallic toner M2 as the uppermost layer makes a relatively large contribution to the sparkly appearance (compared to the contribution to the metallic luster (or lustrous appearance)). The following mechanism may be attributable to this feature. The toner particles (for example, resin-coated fine metal fragments) contained in the layer of the metallic toner M2 as the uppermost layer partially penetrate into the layer of the process-color toner disposed below the layer of the metallic toner M2 in different directions, and therefore the orientations of the toner particles may vary. Light reflected by the toner particles with such diverse orientations provides a level of sparkly appearance (as in the configuration illustrated in FIG. 2 in Japanese Unexamined Patent Application Publication No. 2006-317633). In contrast to this, metallic toner particles are less likely to penetrate into the surface of the printing medium, which is below the layer of the metallic toner M1 as the lowermost layer, than into the toner layers. Thus, the orientations of a large number of metallic toner particles may be more likely to be aligned, and the reflection directions of incident light may be more likely to be aligned. This may enhance the metallic luster (or lustrous appearance). In this exemplary embodiment, accordingly, the layer of the metallic toner M1 as the lowermost layer may be utilized to put emphasis on the metallic luster (or lustrous appearance) while the layer of the metallic toner M2 as the uppermost layer may be utilized to put emphasis on the sparkly appearance.

In the example illustrated in FIG. 1, the arrangement of the photoconductors 2 for the process colors in the order of Y, M, C, and K from the upstream side is merely an example. The toner of one or more additional process colors such as orange, green, or violet in addition to Y, M, C, and K may also be used. In this case, a photoconductor for such an additional color is disposed between the photoconductors 2 for the metallic toners M1 and M2.

In the following description, by way of example of the apparatus according to this exemplary embodiment, a configuration including a print engine illustrated as an example in FIG. 1 is used. As may be understood from the following description, a print engine including a non-belt-shaped intermediate transfer body, or a print engine that transfers toner images on the respective photoconductors directly onto a printing medium (without the intervention of an intermediate transfer body) may be used. Alternatively, a non-tandem print engine, for example, a rotary print engine (in which toners of different colors are temporally sequentially applied to a single photoconductor and resulting images of the toners of the individual colors formed in sequence are superimposed on top of one another on the intermediate transfer body) may be used. Since a rotary print engine employs one photoconductor, unlike a tandem print engine, photoconductors are not arranged from upstream to downstream in a spatial sense. However, even in a rotary print engine, one photoconductor may serve as a photoconductor for toners of colors which are temporally sequentially different. In terms of the time domain, therefore, photoconductors for the individual toners may be regarded as being located from upstream to downstream in the order of the toners being applied (at intervals during which the respective toners are applied).

An example configuration of the image processing apparatus according to this exemplary embodiment will now be described with reference to FIG. 2.

Figure 2:
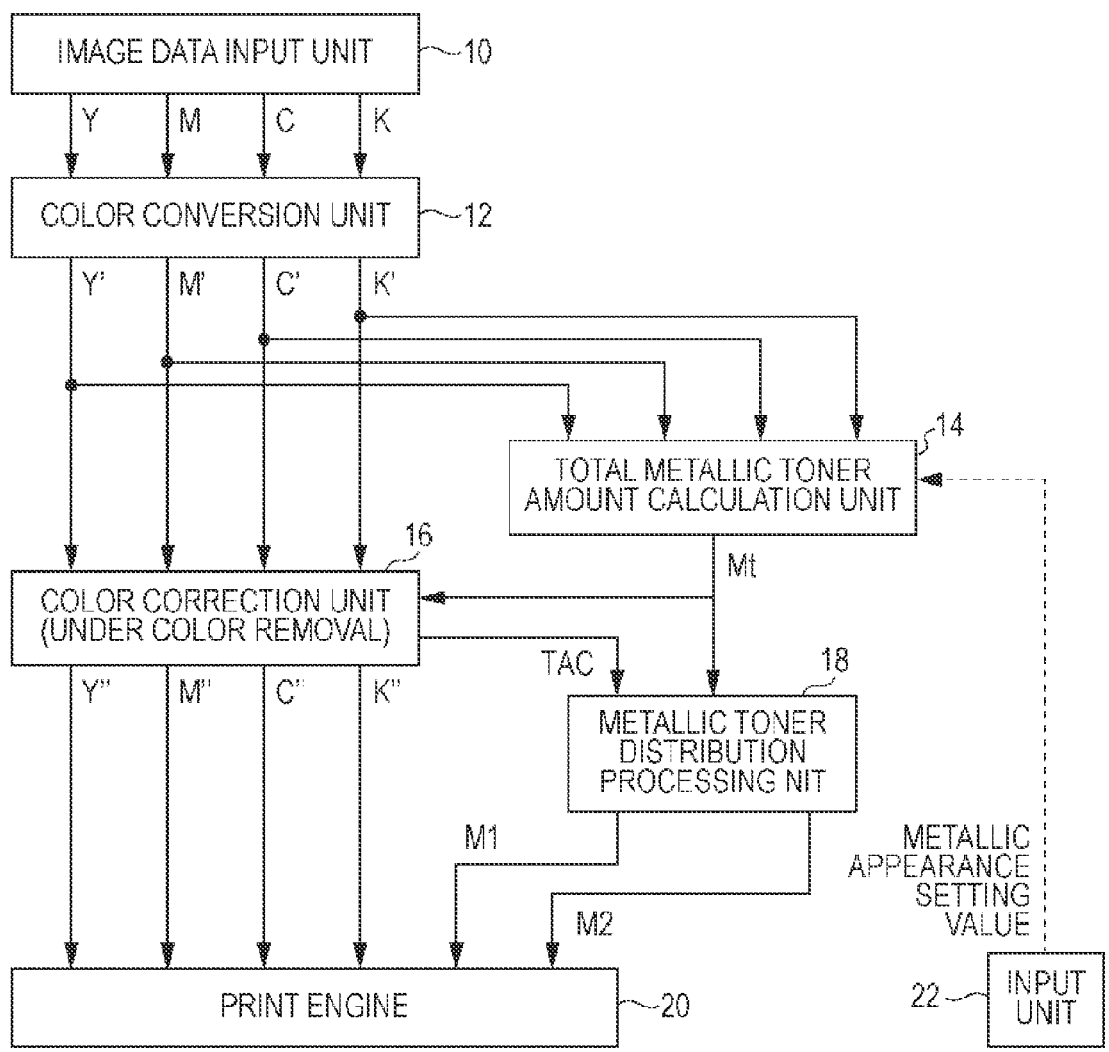
FIG. 2 illustrates an example configuration of a certain portion of the image processing apparatus according to the exemplary embodiment.

Referring to FIG. 2, bitmap image data of four YMCK colors is input to an image data input unit 10. The bitmap image data of the four YMCK colors may be generated by interpreting print data represented by the page description language or the like or may be generated by converting images of RGB colors read by a scanner or the like into the four-printing-primary-color (for example, device-independent) YMCK color space. A color conversion unit 12 converts color values of individual pixels of the image data, or pixel values (Y, M, C, K), into device-dependent color values (Y', M', C', K') in accordance with the color reproducibility of the print engine 20 (illustrated as an example in FIG. 1). The components of the converted color values (Y', M', C', K') correspond to the concentrations (the amounts of toner per pixel) of the toners of the Y, M, C, and K colors. The color values (Y', M', C', K') of the individual pixels are input to a color correction unit 16. The color values (Y', M', C', K') of the individual pixels may be input to a total metallic toner amount calculation unit 14.

The total metallic toner amount calculation unit 14 calculates a total amount of metallic toner Mt to be applied to each pixel in accordance with, for example, a metallic appearance setting value input by a user through an input unit 22. The metallic appearance setting value is a value indicating the strength of the metallic appearance. In a simple example, two metallic appearance setting values, namely, "high" and "low", may be used. More metallic appearance setting values may be used. In the illustrated example, a metallic appearance setting value is input from the input unit 22 provided in the image processing apparatus. However, the metallic appearance setting value may be included as a piece of print data setting information input to the image processing apparatus.

In an exemplary example, the total metallic toner amount calculation unit 14 determines a total amount of metallic toner Mt only using the metallic appearance setting value. To that end, Mt values corresponding to individual metallic appearance setting values (or formulas for calculating a total amount of metallic toner Mt from a metallic appearance setting value) may be determined in advance such that, for example, Mt=100 is determined for the metallic appearance setting value "high" and Mt=50 is determined for the metallic appearance setting value "low". The Mt value of 100 (Mt=100) represents the upper limit of concentration available for the formation of a toner image on a photoconductor 2 for one metallic toner. In the illustrated example, the Mt values of 100 and 50 are the measures of concentration of a metallic toner by dot area ratio, and are merely illustrative values having no special meaning other than that the former is larger than the latter.

In still another example, the total amount of metallic toner Mt may be calculated by taking into account, in addition to the metallic appearance setting value, the color values (Y', M', C', K') input from the color conversion unit 12. The illustrated example is based on the fact that the higher the concentration of the process-color toner, the higher the degree to which the metallic toner M1 in the lowermost layer, which makes a large contribution to the metallic luster (or lustrous appearance), is covered with the process-color toner, resulting in a lower level of metallic luster (or lustrous appearance). In other words, the total amount of metallic toner Mt is determined so as to have a monotonically increasing function, for the same metallic appearance setting value, with respect to a total area coverage (TAC) (area coverage refers to the dot area ratio) value, which is the sum of the components of the color values (Y', M', C', K'). The term "monotonically increasing function", as used herein and throughout this specification and claims, refers to a monotonically increasing function in a broad sense, and means a function f( ) satisfying the condition that if x<y, then f(x)≤f(y). In terms of implementation, for example, a function, a table, or the like that defines the total amount of metallic toner Mt for each pair of values including a metallic appearance setting value and a TAC value may be used.

The value of the total amount of metallic toner Mt calculated by the total metallic toner amount calculation unit 14 is supplied to the color correction unit 16 and a metallic toner distribution processing unit 18.

The color correction unit 16 performs correction for the control of the total amount of toner on a pixel-by-pixel basis. In electrophotographic print engines, there are not a few cases where apparatuses control the total amount of toner for purposes such as preventing fixing failure and toner savings. In order to perform such total amount control, the color correction unit 16 determines whether or not the sum of the color values (Y', M', C', K') of the process colors for each pixel, which are input from the color conversion unit 12, and the total amount of metallic toner Mt for the pixel, which is input from the total metallic toner amount calculation unit 14, is less than or equal to a total toner amount control value (allowable upper limit value of the total amount of toner per pixel).

If the sum exceeds the total toner amount control value, known under color removal (UCR) processing is performed on the color values (Y', M', C', K') of the process colors to reduce the total amount of toner for the process colors, and therefore reduce the total amount of toner including the metallic toners. If the sum of the toners of the process colors and the total amount of metallic toner Mt is less than or equal to the total toner amount control value, the UCR processing is not performed. As may be known, UCR is a process of replacing three components of Y, M, and C in equal amounts with the color of K only to reduce the total amount of toner for YMCK. Color values obtained as a result of correction performed by the color correction unit 16 are represented by (Y", M", C", K"). The color values (Y", M", C", K") are input to the print engine 20. The color values (Y", M", C", K") or the TAC value, which is the sum of the components having the color values (Y", M", C", K"), is input to the metallic toner distribution processing unit 18.

Figure 3:
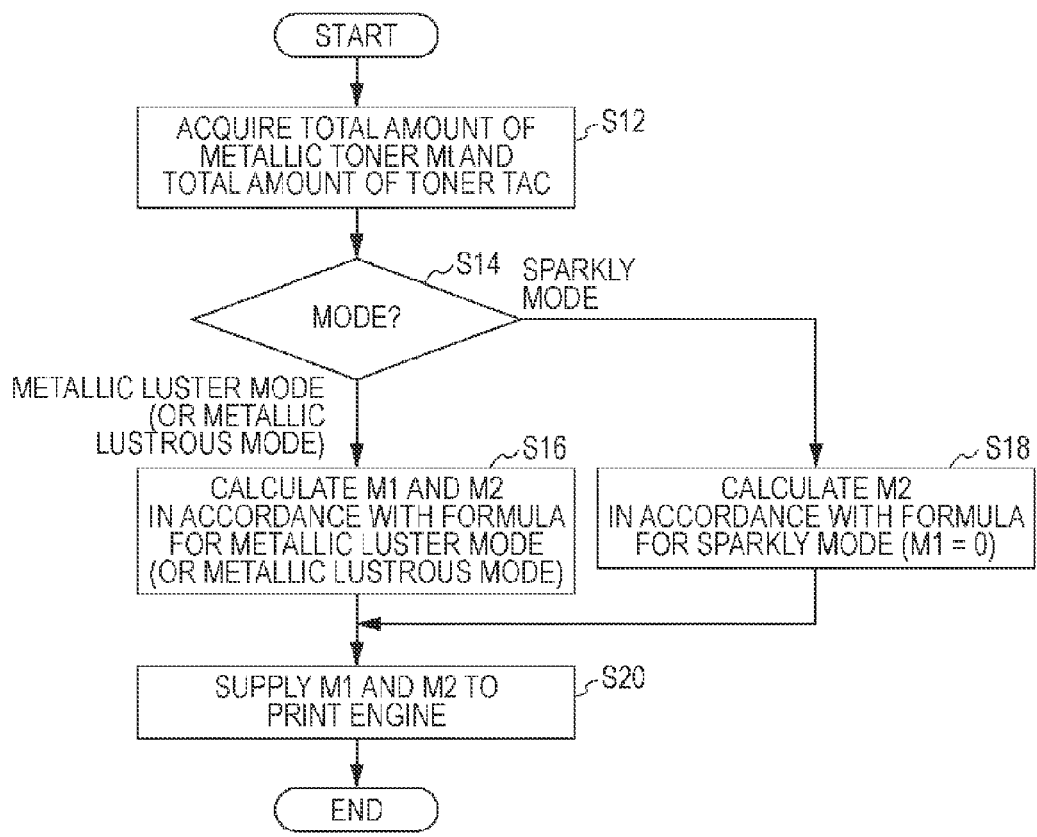
FIG. 3 illustrates an example of a processing procedure of a metallic toner distribution processing unit.

The metallic toner distribution processing unit 18 calculates the amount of metallic toner M1 in the lowermost layer and the amount of metallic toner M2 in the uppermost layer using the total amount of metallic toner Mt and the TAC value of the process colors obtained after UCR. FIG. 3 illustrates an example of the processing procedure of the metallic toner distribution processing unit 18. The metallic toner distribution processing unit 18 executes the process illustrated in FIG. 3 for each pixel of an image to be printed. The procedure illustrated in FIG. 3 is executed when metallic printing is instructed in response to a printing instruction or when an object in print data for which metallic printing is instructed is printed. If either is not applicable, the total metallic toner amount calculation unit 14 and the metallic toner distribution processing unit 18 may execute no processes, and the procedure illustrated in FIG. 3 is not executed.

In the process illustrated in FIG. 3, first, the total amount of metallic toner Mt is acquired from the total metallic toner amount calculation unit 14, and the TAC is acquired from the color correction unit 16 (S12). Then, it is determined which of a metallic luster mode (or metallic lustrous mode) and a sparkly mode a metallic printing mode specified by the user through the input unit 22 or the like is (S14). The metallic luster mode (or metallic lustrous mode) is a mode that puts emphasis on the metallic luster (or lustrous appearance) caused by the specular reflection of incident light in printed color reproduction, and the sparkly mode is a mode that puts emphasis on the shiny appearance produced by metallic toner particles with different orientations.

If the metallic luster mode (or metallic lustrous mode) is specified, the amount of metallic toner M1 and the amount of metallic toner M2 are calculated using the total amount of metallic toner Mt and the TAC in accordance with a calculation rule for the metallic luster mode (or metallic lustrous mode) (S16). An example of the calculation rule is given in formulas (1) as follows:

$$M1 = \alpha_1 \times Mt$$
$$M2 = \alpha_2 \times Mt$$
$$\alpha_1 = f(TAC)$$
$$\alpha_2 = g(TAC) \quad (1)$$

where $\alpha_1$ and $\alpha_2$ denote the "bottom layer metallic ratio" and the "top layer metallic ratio", respectively, and f( ) and g( ) represent the functions of the TAC of a process color.

Figure 4:
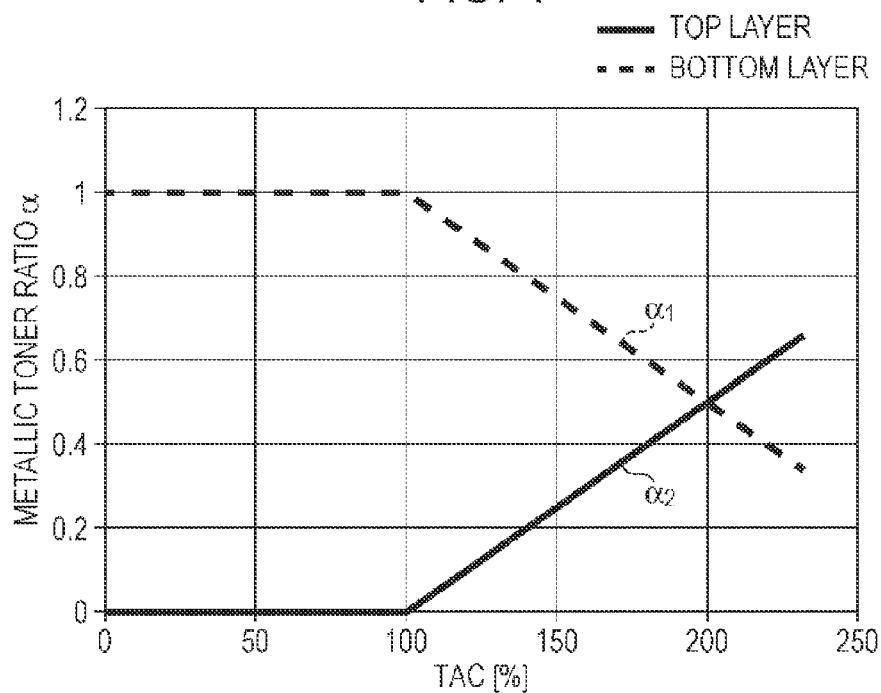
FIG. 4 illustrates an example of a distribution ratio of metallic toners in top and bottom metallic toner layers in a metallic luster mode (or metallic lustrous mode)

FIG. 4 illustrates an example of the bottom layer metallic ratio $\alpha_1$ and the top layer metallic ratio $\alpha_2$ as the functions of the TAC.

In the example illustrated in FIG. 4, in a low-TAC range (range of 0% to 100%), the bottom layer metallic ratio $\alpha_1$ is equal to 1 and the top layer metallic ratio $\alpha_2$ is equal to 0. In the other words, in the low-TAC range, all the total amount of metallic toner Mt is allocated to the metallic toner M1 in the bottom layer while the amount of metallic toner M2 in the top layer is 0. The reason is that the amount by which the metallic toner M1 in the bottom layer is covered by the layers of the process-color toners is small in a range where the TAC of the process colors is low. That is, in this range, even though the metallic luster (or lustrous appearance) is represented only with the metallic toner M1 in the bottom layer, which makes a large contribution to the metallic luster (or lustrous appearance), a reduction in the level of metallic luster (or lustrous appearance) due to the coverage with the layers of the process-color toners will be within an allowable range.

In contrast, in a range where the TAC exceeds 100%, the bottom layer metallic ratio $\alpha_1$ is gradually reduced while the top layer metallic ratio $\alpha_2$ is gradually increased. If the TAC of the process colors exceeds 100%, the coverage of the metallic toner M1 in the bottom layer with the layers of the process-color toners will not be negligible, and simply allocating all the total amount of metallic toner Mt to the metallic toner M1 in the bottom layer may not be sufficient to achieve a specified level of metallic luster (or lustrous appearance). In this range, therefore, part of the total amount of metallic toner Mt is allocated to the metallic toner M2 in the top layer to compensate for the insufficient level of metallic luster (or lustrous appearance). As described above, the metallic toner M2 in the top layer makes a larger contribution to the sparkly appearance than to the metallic luster (or lustrous appearance), but is more effective to enhance the metallic luster (or lustrous appearance) than the metallic toner M1 below the thick layers of the process-color toners. Thus, increasing the proportion of the amount of metallic toner M2 in the top layer as the TAC of the process colors increases may compensate for the reduction in metallic luster (or lustrous appearance) due to the coverage of the metallic toner M1 in the bottom layer with the layers of the process-color toners so that a corresponding level of metallic luster (or lustrous appearance) to the specified metallic appearance setting value may be maintained.

The functions for the bottom layer metallic ratio $\alpha_1$ and top layer metallic ratio $\alpha_2$ illustrated in FIG. 4 are merely examples. For example, in the example illustrated in FIG. 4, the boundary between the range where the metallic luster (or lustrous appearance) is formed by the metallic toner M1 in the bottom layer only and the range where the metallic toner M2 in the top layer is used to compensate for an insufficient level of metallic luster (or lustrous appearance) is represented by TAC=100%, which is merely an example. The TAC value of an appropriate boundary may also be affected by the characteristics of the print engine 20 and the like, and may therefore be determined by experiment or some other method. In the example illustrated in FIG. 4, furthermore, the bottom layer metallic ratio $\alpha_1$ and the top layer metallic ratio $\alpha_2$ are kept constant in the range where the TAC ranges from 0% to 100%, which is also merely an example. The function for the bottom layer metallic ratio $\alpha_1$ may be a monotonically decreasing function of the TAC, and the function for the top layer metallic ratio $\alpha_2$ may be a monotonically increasing function of the TAC. Specific functions may be determined by color measurement experiment or some other method.

In S16, the bottom layer metallic ratio $\alpha_1$ and the top layer metallic ratio $\alpha_2$ with respect to the TAC value, which is the total amount of process-color toner determined by the color correction unit 16, are determined using, for example, the functions illustrated in FIG. 4, and the ratios $\alpha_1$ and $\alpha_2$ and the total amount of metallic toner Mt are applied to formulas (1) to calculate the amount of metallic toner M1 in the bottom layer and the amount of metallic toner M2 in the top layer.

Referring back to FIG. 3, if the metallic printing mode is the sparkly mode, which puts emphasis on a sparkly appearance, the amount of metallic toner M1 and the amount of metallic toner M2 are calculated using the total amount of metallic toner Mt and the TAC in accordance with a calculation rule for the sparkly mode (S18).

Figure 5:
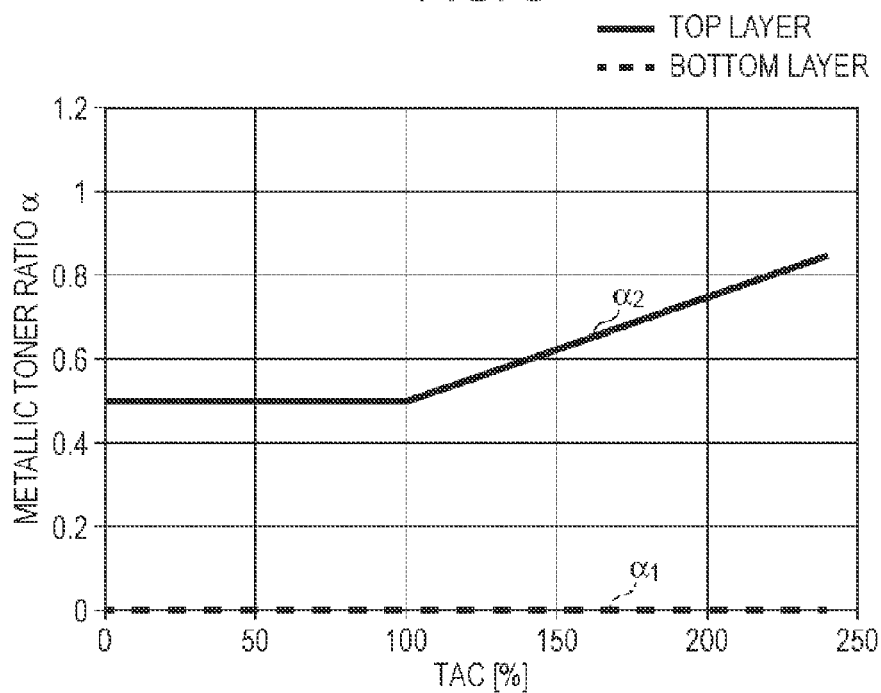
FIG. 5 illustrates an example of a distribution ratio of metallic toners in the top and bottom metallic toner layers in a sparkly mode.

Also in the sparkly mode, the amounts of metallic toner M1 and M2 may be calculated using formulas (1), where the bottom layer metallic ratio $\alpha_1$ and the top layer metallic ratio $\alpha_2$ are different from those in the metallic luster mode (or metallic lustrous mode). Specifically, in the sparkly mode, as illustrated in FIG. 5 by way of example, the bottom layer metallic ratio $\alpha_1$ is kept constant at 0 regardless of the TAC, while the top layer metallic ratio $\alpha_2$ is kept at a certain value, for example, 0.5 until the TAC reaches 100%, and increases in accordance with the value of the TAC in a range where the TAC exceeds 100%. The reason that the bottom layer metallic ratio $\alpha_1$ is kept constant at 0 is that the layer of the metallic toner M1 as the bottom layer does not substantially contribute to the sparkly appearance. Further, the reason that the top layer metallic ratio $\alpha_2$ increases in accordance with the value of the TAC in the range where the TAC exceeds 100% is that as the thickness of the layers of the process-color toners increases, the metallic toner M2 in the top layer may be more likely to be buried in the layers of the process-color toners below the layer of the metallic toner M2. The metallic toner M2 in the top layer, which is deeply buried in the layers of the process-color toners therebelow, will not contribute to the sparkly appearance. As the thickness of the layers of the process-color toners increases, the amount by which the metallic toner M2 in the top layer is buried increases. In this range, therefore, the amount of metallic toner M2 is increased in accordance with an increase in TAC to compensate for the buried portion. This enables an equivalent level of sparkly appearance to that for a fixed distribution ratio (for example, 0.5) of the metallic toner M2 in the top layer in the range where the TAC ranges from 0% to 100% to be maintained also in the range where the TAC exceeds 100%.

In the example illustrated in FIG. 5, a top layer metallic ratio $\alpha_2$ of 0.5 in the range where the TAC is not greater than 100% is merely an example. The value corresponding to the sparkly appearance desired by the image processing apparatus may be determined by experiment or some other method, and may be set. In the example illustrated in FIG. 5, furthermore, the boundary between the range where the top layer metallic ratio $\alpha_2$ is kept constant and the range where the top layer metallic ratio $\alpha_2$ increases in accordance with the TAC is represented by TAC=100%, which is also merely an example. The TAC value of an appropriate boundary may also be affected by the characteristics of the print engine 20 and the like, and may therefore be determined by experiment or some other method. In the example illustrated in FIG. 5, furthermore, the top layer metallic ratio $\alpha_2$ is kept constant in the range where the TAC ranges from 0% to 100%, which is also merely an example. The function for the top layer metallic ratio $\alpha_2$ may be a monotonically increasing function of the TAC, and a function for the characteristics of the print engine 20 and the like may be determined by experiment or some other method.

In S18, the bottom layer metallic ratio $\alpha_1$ is equal to 0, and the top layer metallic ratio $\alpha_2$ with respect to the TAC value, which is the total amount of process-color toner determined by the color correction unit 16, is determined using, for example, the function illustrated in FIG. 5. Then, the ratios $\alpha_1$ and $\alpha_2$ and the total amount of metallic toner Mt are applied to formulas (1) to calculate the amount of metallic toner M1 (=0) in the bottom layer and the amount of metallic toner M2 in the top layer.

Figure 6:
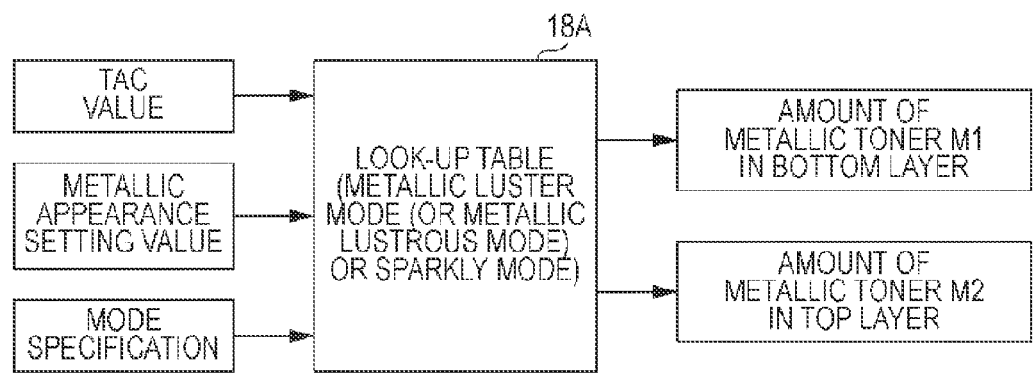
FIG. 6 illustrates an example of the metallic toner distribution processing unit which is configured as a look-up table.

The functions illustrated in FIGS. 4 and 5 may be implemented as, for example, as illustrated in FIG. 6, a look-up table 18A used to determine the amount of metallic toner M1 in the bottom layer and the amount of metallic toner M2 in the top layer using a combination of the TAC value of the process-color toners, the metallic appearance setting value, and the specified mode (the metallic luster mode (or metallic lustrous mode) or the sparkly mode).

Then, in S20, the values of the amounts of metallic toner M1 and M2 determined in S16 or S18 in accordance with the mode are supplied to the print engine 20. The print engine 20 controls the amounts of light exposed to the photoconductors 2 for the metallic toners M1 and M2 in accordance with the color values (Y", M", C", K") of the process colors input from the color correction unit 16 and the values of the amounts of metallic toner M1 and M2 in the bottom layer and the top layer input from the metallic toner distribution processing unit 18 to form latent images corresponding to the values on the respective photoconductors 2.

In this exemplary embodiment, with the control described above, in the metallic luster mode (or metallic lustrous mode), the metallic luster (or lustrous appearance) is basically produced by the metallic toner M1 in the bottom layer. If the metallic luster (or lustrous appearance) produced by the metallic toner M1 in the bottom layer deteriorates so as to result in a dull-looking image due to an increase in the amount of process-color toner, the amount of metallic toner M2 in the top layer is increased to compensate for the deterioration of the metallic luster (or lustrous appearance).

The metallic toner M2 in the top layer may be implemented as a toner having lower viscoelasticity when fixed than the metallic toner M1 in the bottom layer (for example, toner particles or a carrier material with viscoelasticity lower than that of the metallic toner M1 may be selected). This may increase the smoothness of the surface of the layer of the metallic toner M2 as the top layer when fixed to increase the specular reflection, resulting in an artificial increase of the metallic luster (or lustrous appearance).

In the apparatus according to this exemplary embodiment, in the sparkly mode, the amount of metallic toner M1 in the bottom layer, which makes a small contribution to the sparkly appearance, is set to 0 while only the metallic toner M2 in the top layer is used to efficiently achieve a sparkly appearance. If the TAC of the process-color toners increases, the amount of metallic toner M2 in the top layer is also increased accordingly to compensate for the reduction in the level of sparkly appearance due to the metallic toner M2 in the top layer being buried in the process-color toners.

While the print engine 20, which is a tandem print engine, has been described by way of example, an electrophotographic print engine which uses the rotary development method may also be used in this exemplary embodiment. In the rotary development method, dedicated developing devices may be provided individually for the metallic toner M1 in the bottom layer and the metallic toner M2 in the top layer, or a common developing device for the metallic toners may be used at the beginning and end of the printing cycle for one page to form the layer of the metallic toner M2 as the top layer and the layer of the metallic toner M1 as the bottom layer. In a configuration in which dedicated developing devices are provided individually for the metallic toners M1 and M2, a toner having lower viscoelasticity when fixed than the metallic toner M1 in the bottom layer may be used as the metallic toner M2 in the top layer.

The foregoing exemplary embodiment is merely an example, and a variety of modifications may be made without departing from the scope of the present invention. For example, in the foregoing exemplary embodiment, correction and other computational operations are performed on a pixel-by-pixel basis. However, the unit of computation is not limited to a pixel. For example, the computational operations similar to those described above may be performed for each predetermined unit region such as a block including a predetermined number of pixels.

The information processing function (the function modules other than the print engine 20) of the image processing apparatus described above as an illustrative example may be implemented by, for example, causing a general-purpose computer to execute a program for implementing processing of each of the function modules of the apparatus. The computer has a circuit configuration in which, for example, as hardware, a microprocessor such as a central processing unit (CPU), memory devices (primary memory) such as a random access memory (RAM) and a read-only memory (ROM), a hard disk drive (HDD) controller that controls an HDD, various input/output (I/O) interfaces, a network interface that controls connection with a network such as a local area network, and so forth are connected to one another via, for example, a bus. Further, a disk drive for reading from and/or writing to a portable disk recording medium such as a compact disc (CD) or a digital versatile disc (DVD), a memory reader/writer or the like for reading from and/or writing to portable non-volatile recording media according to various standards, such as a flash memory, or any suitable device may be connected to the bus via, for example, an I/O interface. A program describing the content of the processing of each of the function modules described above as an illustrative example is stored in a fixed storage device such as a hard disk drive and installed into a computer via a recording medium such as a CD or a DVD or via a communication unit such as a network. The program stored in the fixed storage device is loaded onto the RAM and executed by the microprocessor such as a CPU to implement the function modules described above as an illustrative example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a color material layer forming unit that forms on a surface of a printing medium a first metallic color material layer including a first color material having metallic particles, one or more process color material layers including color materials of one or more process colors, and a second metallic color material layer including a second color material having metallic particles so that the first metallic color material layer, the one or more process color material layers, and the second metallic color material layer are stacked on top of one another on the surface of the printing medium in order of the first metallic color material layer, the one or more process color material layers, and the second metallic color material layer; and
    a proportion controller that has a function for executing first control to increase a proportion of the second metallic color material layer with respect to the first metallic color material layer when a total amount of the color materials of the one or more process colors exceeds a predetermined value.

2. The image processing apparatus according to claim 1, wherein the color material layer forming unit uses, as the second color material of the second metallic color material layer, a color material having lower viscoelasticity when fixed than the first color material of the first metallic color material layer.

3. The image processing apparatus according to claim 1, further comprising:
    a mode selection receiving unit that receives selection of one of operation modes of the image processing apparatus from a user, the operation modes including a metallic luster mode that prioritizes a metallic luster and a sparkly mode that prioritizes a sparkly appearance,
    wherein when the metallic luster mode is selected, the proportion controller executes the first control, and when the sparkly mode is selected, the proportion controller executes second control to set the amount of the first color material of the first metallic color material layer to 0 and to increase the amount of the second color material of the second metallic color material layer to be larger than 0 in accordance with the total amount of the color materials of the one or more process colors.

4. The image processing apparatus according to claim 2, further comprising:
    a mode selection receiving unit that receives selection of one of operation modes of the image processing apparatus from a user, the operation modes including a metallic luster mode that prioritizes a metallic luster and a sparkly mode that prioritizes a sparkly appearance,
    wherein when the metallic luster mode is selected, the proportion controller executes the first control, and when the sparkly mode is selected, the proportion controller executes second control to set the amount of the first color material of the first metallic color material layer to 0 and to increase the amount of the second color material of the second metallic color material layer to be larger than 0 in accordance with the total amount of the color materials of the one or more process colors.

5. The image processing apparatus according to claim 3, wherein in the sparkly mode, the proportion controller determines the amount of the second metallic color material of the second metallic color material layer using a monotonically increasing function of the total amount of the color materials of the one or more process colors.

6. The image processing apparatus according to claim 4, wherein in the sparkly mode, the proportion controller determines the amount of the second metallic color material of the second metallic color material layer using a monotonically increasing function of the total amount of the color materials of the one or more process colors.

7. The image processing apparatus according to claim 1, further comprising:
    an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

8. The image processing apparatus according to claim 2, further comprising:
an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

9. The image processing apparatus according to claim 3, further comprising:
an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

10. The image processing apparatus according to claim 4, further comprising:
an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

11. The image processing apparatus according to claim 5, further comprising:
an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

12. The image processing apparatus according to claim 6, further comprising:
an under color removal unit that performs under color removal on the color materials of the one or more process colors of the one or more process color material layers if a total amount of the first color material of the first metallic color material layer, the color materials of the one or more process colors of the one or more process color material layers, and the second color material of the second metallic color material layer exceeds a predetermined total amount control value, the under color removal unit controlling the color material layer forming unit to use, as the color materials of the one or more process colors, color materials having amounts that are obtained as a result of the under color removal.

13. An image processing method comprising:
forming on a surface of a printing medium a first metallic color material layer including a first color material having metallic particles, one or more process color material layers including color materials of one or more process colors, and a second metallic color material layer including a second color material having metallic particles so that the first metallic color material layer, the one or more process color material layers, and the second metallic color material layer are stacked on top of one another on the surface of the printing medium in order of the first metallic color material layer, the one or more process color material layers, and the second metallic color material layer; and
executing first control to increase a proportion of the second metallic color material layer with respect to the first metallic color material layer when a total amount of the color materials of the one or more process colors exceeds a predetermined value.

14. A non-transitory computer readable medium storing a program causing a computer to execute a process, the process comprising:
determining a proportion of a top metallic color material layer including a color material having metallic particles and a proportion of a bottom metallic color material layer including a color material having metallic particles so that the proportion of the top metallic color material layer is higher than the proportion of the bottom metallic color material layer in accordance with a total amount of color materials of one or more process colors of one or more process color material layers when the total amount of the color materials of the one or more process colors exceeds a predetermined value; and
forming the top metallic color material layer, the one or more process color material layers, and the bottom metallic color material layer on a surface of a printing medium in accordance with the determined proportions so that the bottom metallic color material layer, the one or more process color material layers, and the top metallic color material layer are stacked on top of one another on the surface of the printing medium in order of the bottom metallic color material layer, the one or more process color material layers, and the top metallic color material layer.

\* \* \* \* \*